United States Patent
Attarwala et al.

(10) Patent No.: US 7,146,897 B1
(45) Date of Patent: *Dec. 12, 2006

(54) UV/VISIBLE LIGHT AND ANAEROBIC CURABLE COMPOSITION

(75) Inventors: Shabbir Attarwala, Simsbury, CT (US); Ronald E. Belek, Coventry, CT (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/044,068

(22) Filed: Jan. 28, 2005

Related U.S. Application Data

(63) Continuation-in-part of application No. 09/612,493, filed on Jul. 7, 2000, now Pat. No. 6,460,464.

(60) Provisional application No. 60/380,957, filed on May 16, 2002, provisional application No. 60/144,484, filed on Jul. 19, 1999.

(51) Int. Cl.
*F42B 5/26* (2006.01)
*F42B 33/00* (2006.01)

(52) U.S. Cl. .................. 86/19.8; 86/19.5; 102/470; 102/430

(58) Field of Classification Search ............. 86/19.5, 86/19.8; 102/430, 470
See application file for complete search history.

(56) References Cited

U.S. PATENT DOCUMENTS

| | | | |
|---|---|---|---|
| 1,879,278 A | 9/1932 | Jacobs | |
| 3,046,262 A | 7/1962 | Krieble | 260/89.5 |
| 3,218,305 A | 11/1965 | Krieble | 260/89.5 |
| 3,428,614 A | 2/1969 | Brownstein | 260/77.5 |
| 3,794,610 A | 2/1974 | Bachmann | 260/31.6 |
| 3,847,081 A | 11/1974 | Quinlan et al. | 102/38 |
| 3,855,040 A | 12/1974 | Malofsky | 156/310 |
| 4,080,238 A | 3/1978 | Wolinski et al. | 156/305 |
| 4,180,640 A | 12/1979 | Melody et al. | 526/323.1 |
| 4,287,330 A | 9/1981 | Rich | 526/270 |
| 4,321,349 A | 3/1982 | Rich | 526/270 |
| 4,407,856 A | 10/1983 | Pitts | 427/495 |
| 4,533,446 A | 8/1985 | Conway et al. | 204/159.24 |
| 4,855,002 A | 8/1989 | Dunn | 156/307.3 |
| 4,942,800 A | 7/1990 | Bouillet | |
| 4,963,201 A | 10/1990 | Bjerke et al. | 149/2 |
| 5,081,308 A | 1/1992 | Gosciniak | 568/328 |
| 5,218,009 A | 6/1993 | Rutsch et al. | 522/16 |
| 5,534,559 A | 7/1996 | Leppard et al. | 522/64 |
| 5,639,986 A | 6/1997 | Evans | 102/531 |
| 5,730,828 A | 3/1998 | Somemiya | 156/273.3 |
| 6,043,327 A | 3/2000 | Attarwala | 526/259 |
| 6,090,453 A | 7/2000 | Narang et al. | 427/504 |
| 6,136,880 A | 10/2000 | Snowwhite et al. | 522/64 |
| 6,150,479 A | 11/2000 | Klemarczyk | 526/90 |

(Continued)

FOREIGN PATENT DOCUMENTS

JP 5-105847 4/1993

OTHER PUBLICATIONS

F.J. Boerio and P.P. Hong, *Langmuir*, 6, "Surface-Enhanced Raman Scattering from Model Acrylic Adhesive Systems", pp. 721-727, (1990).

(Continued)

*Primary Examiner*—Susan Berman
(74) *Attorney, Agent, or Firm*—Steven C. Bauman

(57) ABSTRACT

This invention relates to a visible light or UV/visible light and anaerobically curable composition for encapsulating the surface of the primer mix disposed in the primer cup, particularly for use in center fire ammunition.

2 Claims, 1 Drawing Sheet

U.S. PATENT DOCUMENTS

| | | | |
|---|---|---|---|
| 6,231,714 B1 | 5/2001 | Woods et al. | 156/275.7 |
| 6,342,545 B1 | 1/2002 | Klemarczyk | 523/176 |
| 6,451,948 B1 | 9/2002 | Woods et al. | 526/313 |
| 6,460,464 B1 * | 10/2002 | Attarwala | 102/469 |
| 6,883,413 B1 * | 4/2005 | Attarwala et al. | 86/10 |

OTHER PUBLICATIONS

A. Torres-Filho and D.C. Neckers, *Journal of Appl. Polym. Sci.*, vol. 51, "Mechanical Properties of Acrylate Networks Formed by Visible Laser-Induced Polymerization. I. Dependence on Photopolymerization Parameters", pp. 931-937 (1994).

T. Tanabe, et al., *Journal of Polym. Sci.: Part A: Polym. Chem.*, vol. 33, "Visible Light Photopolymerization: Synthesis of New Fluorone Dyes and Photopolimerization of Acrylic Monomers Using Them", pp. 1691-1703 (1995).

A. Torres-Filho and D.C. Neckers, *Chem. Mater.*, vol. 7, No. 4, "Mechanical Properties of Acrylate Networks Formed by Visible Laser-Induced Polymerization. 2. Control of the Mechanical Properties", pp. 744-753 (1995).

* cited by examiner

UV/VISIBLE LIGHT AND ANAEROBIC CURABLE COMPOSITION

RELATED APPLICATION DATA

This application is a Divisional of application Ser. No. 10/429,038, filed May 5, 2003, now U.S. Pat. No. 6,883,413, which claims benefit of provisional application 60/380,957, filed May 16, 2002, and which is a Continuation-in-Part of application Ser. No. 09/612,493, filed Jul. 7, 2000, now U.S. Pat. No. 6,460,464, which claims benefit of provisional application 60/144,484, filed Jul. 19, 1999.

BACKGROUND OF THE INVENTION

1. Field of the Invention

This invention relates to a visible light and anaerobic curing composition for encapsulating the surface of the primer mix disposed in the primer cup, particularly for use in center fire ammunition.

2. Brief Description of Related Technology

Anaerobic curable compositions are known, as are anaerobic curable compositions having a secondary cure mechanism, such as ultraviolet curing. Such adhesives are widely used commercially. However, until now, anaerobic curable compositions having a secondary visible light cure mechanism remained unknown.

As noted, radiation curable anaerobic adhesive compositions are known. For instance, U.S. Pat. No. 4,533,446 (Conway) is directed to such a composition that includes an anaerobically curable monomer, cationic photoinitiator, a peroxide and a ferrocence-based anaerobic polymerization initiator. However, in practice, these compositions have poor pot life since the metal ion in the ferrocene compound acts to initiate anaerobic cure.

U.S. Pat. No. 6,136,880 (Snowwhite) is an example of a radiation curable composition for optical fiber coatings that employs an acylphosphine oxide photoinitiator, which themselves are disclosed in U.S. Pat. Nos. 5,218,009 and 5,534,559, and examples of which are commercially available from Vantico Inc., Brewster, N.Y. under the tradename "IRGACURE" 819 (bis(2,4,6-trimethyl benzoyl)phenyl phosphine oxide), for one.

In a commercial application, in which sealing against environmental contaminants is important, others have used solvent-based lacquers or dissolved polymers, like nitrocellulose, to coat the primer mix disposed in a primer cup in ammunition. See e.g. U.S. Pat. No. 1,879,278.

However, in these known methods, the use of solvent is not environmentally friendly or healthy to the worker handling these coating materials. In addition, the solvent tends to interact with the primer mix, rendering the primer mix contaminated and less efficient in use.

It would thus be desirable to provide a visible light curable composition to provide a protective barrier from environmental contaminants, particularly during storage, that does not suffer from these recognized shortcomings.

SUMMARY OF THE INVENTION

The present invention provides visible and UV/visible anaerobic dual curable compositions, particularly well-suited for encapsulating the surface of the primer mix dispensed in the primer cup, particularly in center fire ammunition. The initial visible or UV/visible cure forms a film on the surface of the composition and anaerobic cure occurs beneath the formed film through the remaining depth of the composition.

More specifically, the adhesives include a (meth)acrylate component; an anaerobic cure-inducing component; and a photoinitiator component that comprises a visible light cure photoinitiator and optionally a UV/visible light cure photoinitiator.

The invention is also directed to a method of making such compositions, as well as a method of using them. For instance, the invention provides a method of using the compositions in the assembly of ammunition, such as a primer mix encapsulant.

In addition, the invention provides cured reaction products of these compositions.

DETAILED DESCRIPTION OF THE INVENTION

Figure 1:
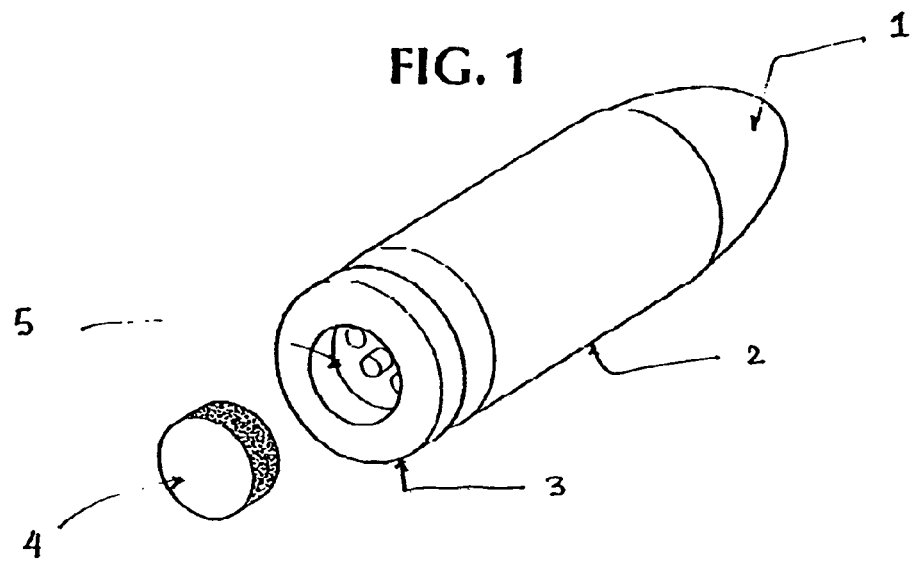
FIG. 1 depicts an exploded perspective view of a cartridge assembled using the inventive composition.

As noted above, the inventive compositions include a (meth)acrylate component; an anaerobic cure-inducing composition; and a photoinitiator component that comprises a visible light cure photoinitiator and optionally a UV/visible light cure photoinitiator. The composition may also include a plasticizer component in an amount less than about 30% by weight of the total composition.

These compositions are particularly well suited for encapsulating the primer mix disposed in the primer cup initially by a visible light cure and/or UV/visible light cure mechanism followed by an anaerobic cure mechanism. The cured encapsulate assists in preventing environmental contaminants from fouling the effectiveness of the primer. The ingress of moisture, for instance, into the primer cup, in which is disposed a primer mix (oftentimes a lead-free primer), may lead to the degradation of the quality of the primer mix and thus shorten shelf life and effectiveness of the primer mix itself.

In addition, the use of the shielded metal halide lamp generates less heat from infrared radiation than many other such lamps (like tungsten or mercury lamps), which is beneficial because elevated temperature conditions may be detrimental to the primer mix. For instance, shelf life may be compromised and more importantly the primer mix may prematurely decompose detonating the ammunition.

The (meth)acrylates that may be used in the adhesive composition in accordance with this invention include a wide variety of materials represented by $H_2C=CGCO_2R$, where G may be hydrogen, halogen or alkyl of 1 to about 4 carbon atoms, and R may be selected from alkyl, cycloalkyl, alkenyl, cycloalkenyl, alkaryl, aralkyl or aryl groups of 1 to about 16 carbon atoms.

More specific (meth)acrylates particularly desirable for use herein include polyethylene glycol di(meth)acrylates, trimethylolpropylane tri(meth)acrylate, bisphenol-A di(meth)acrylates, such as ethoxylated bisphenol-A (meth)acrylate ("EBIPMA") and tetrahydrofurane (meth)acrylates and di(meth)acrylates, isobornyl acrylate, hydroxypropyl (meth)acrylate, and hexanediol di(meth)acrylate. Of course, combinations of these (meth)acrylates may also be used.

The (meth)acrylate component will form the basis of the adhesive composition. That is, the composition may be comprised of greater than about 90% by weight of (meth) acrylate, such as about greater than about 95% by weight. However, when an optional plasticizer is added, the amount of (meth)acrylate component should be adjusted accordingly.

The compositions are rendered curable anaerobically by including an anaerobic cure-inducing composition there. The composition is applied to a substrate, and when exposed to visible light and/or UV/visible light for an appropriate period of time, forms a film on the surface thereof. Beneath the surface of the formed film, the depth of the remaining portion of the composition may cure under anaerobic conditions.

Such an anaerobic cure-inducing composition useful in the present invention includes a peroxide, such as cumene hydroperoxide or benzoyl peroxide. In addition, accelerators may be included in the anaerobic cure inducing composition. The accelerators include amines (such as amine oxides, sulfonamides and triazines). Thus, a desirable anaerobic cure inducing composition in accordance with the present invention includes a peroxide, such as cumene hydroperoxide, and one or more accelerators, such as saccharin, toluidenes, like N,N-diethyl-p-toluidene and N,N-dimethyl-o-toluidene, acetyl phenylhydrazine, and maleic acid. Of course, other materials known to induce anaerobic cure may also be included or substituted therefor. See e.g., Loctite U.S. Pat. No. 3,218,305 (Krieble), U.S. Pat. No. 4,180,640 (Melody), U.S. Pat. No. 4,287,330 (Rich) and U.S. Pat. No. 4,321,349 (Rich). Quinones, such as napthoquinone and anthraquinone, may also be included in the anaerobic cure inducing composition to scavenge free radicals which form.

The anaerobic cure-inducing composition should be used in an amount up to about 10% by weight of the total composition, such as in the range of about 4% to about 8% by weight.

The visible light cure photoinitator component used in the compositions of the present invention is ordinarily triggered by exposure to radiation in the visible range of the electromagnetic spectrum, as well as a tailing portion into the UV range of that spectrum. Oftentimes, the visible light cure photoinitator is an acylphosphine oxide. For instance, visible light cure photoinitiators available commercially from Vantico Inc., Brewster, N.Y. under the "IRGACURE" tradename are desirable, specifically "IRGACURE" 819 (bis(2, 4,6-trimethyl benzoyl)phenyl phosphine oxide) and 784DC (bis($\eta^5$-2,4-cyclopentadien-1-yl)-bis-[2,6-difluoro-3-(1H-pyrrol-1-yl)phenyl]titanium).

Other visible light cure photoinitiators include quinones, such as camphorquinone, and fluorones [See F. J. Boerio, et al., *Langmuir*, 6, 721–727, (1990), A. Torres-Filho, et al., *Journal of Applied Polymer Science*, Vol. 51, 931–937 (1994), T. Tanabe, et al., *Journal of Polymer Science: Part A: Polymer Chemistry*, Vol. 33, 1691–1703 (1995), and A. Torres-Filho, et al., *Chemistry of Materials*, Vol. 7, No. 4, 744–753 (1995), the disclosures of each of which are expressly incorporated herein by reference].

Where a UV photoinitiator is also included, such photoinitiators may be selected from, but are not limited to, photoinitiators available commercially from Ciba Specialty Chemicals, Tarrytown, N.Y. under the "IRGACURE" and "DAROCUR" tradenames, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl) phosphine oxide and 2-hydroxy-2-methyl-1-phenyl-propan-1-one), and "DAROCUR" 1173 (2-hydroxy-2-methyl-1-phenyl-1-propane) and 4265 (the combination of 2,4,6-trimethylbenzoyl-diphenyl-phosphine oxide and 2-hydroxy-2-methyl-1-phenyl-propan-1-one). In addition, alkyl pyruvates, such as methyl, ethyl, propyl, and butyl pyruvates, and aryl pyruvates, such as phenyl, benzyl, and appropriately substituted derivatives thereof may be used as well. Of course, combinations of these materials may also be employed herein.

The photoinitiator may be used in an amount of from about 0.5 to about 10% by weight of the total composition, such as about 4 to about 6% by weight.

The compositions may also include a plasticizer to aid in impact resistance when the adhesive is cured. Ordinarily, the plasticizer should be used in an amount less than about 30% by weight of the total composition, such as about 5% to about 20% by weight, when used. A particularly desirable plasticizer is a non-reactive plasticizer, such as the polyester glycol, tetraethylene glycol di-2-ethyl hexoate.

Of course, other plasticizers may also be used such as those set forth in U.S. Pat. No. 3,794,610 (Bachmann), the disclosure of which is hereby expressly incorporated herein by reference.

Another particularly desirable plasticizer for use herein is a polymeric plasticizer, such as one available commercially under the tradename "UNIFLEX" 300 from Unicamp Corporation, Jacksonville, Fla. "UNIFLEX" 300 is a medium molecular weight polymeric plasticizer (made from hexanedioic acid and polymer with 1,4-butane diol and 1,2-propane diol), which is liquid at 25° C. whose viscosity at that temperature is 3300 cps. This polymeric plasticizer is reported to be resistant to high temperatures.

The compositions may also include a colored or fluorescent dye to allow the user to determine the location of the composition on the primer mix.

Desirably, the inventive composition in the uncured state should have a viscosity that is low enough to permit dispensing using a conventional pin transfer method, or a fine needle dispensing method.

Once the composition has been applied, cure may occur through exposure to particular radiation in the electromagnetic spectrum. This radiation may be generated by a shielded metal halide lamp, such as one that is commonly used as a grow light for plants. Sunlight Systems of California sells such a lamp under designation no. MH-1500. This lamp generates predominately visible light, as much UV is filtered from the energy generated by an appropriate borosilicate glass. By filtering UV light, use of this lamp for its intended purpose, that is as a grow light for plants, renders the lamp safe for workers and passers by as they are not exposed to harmful UV radiation. The lamp also generates a small amount of infrared radiation, which can act as a heat source. However, unlike other lamps that generate infrared radiation, such as tungsten lamps, the shielded metal halide lamp used in connection with the present invention is a "cold" lamp as it emits a much smaller amount of infrared radiation than other such lamps.

The invention also provides a process for making such compositions, a step of which includes combining in an open vessel in the substantial absence of radiation in the visible region of the electromagnetic spectrum the components of the composition.

Figure 2:
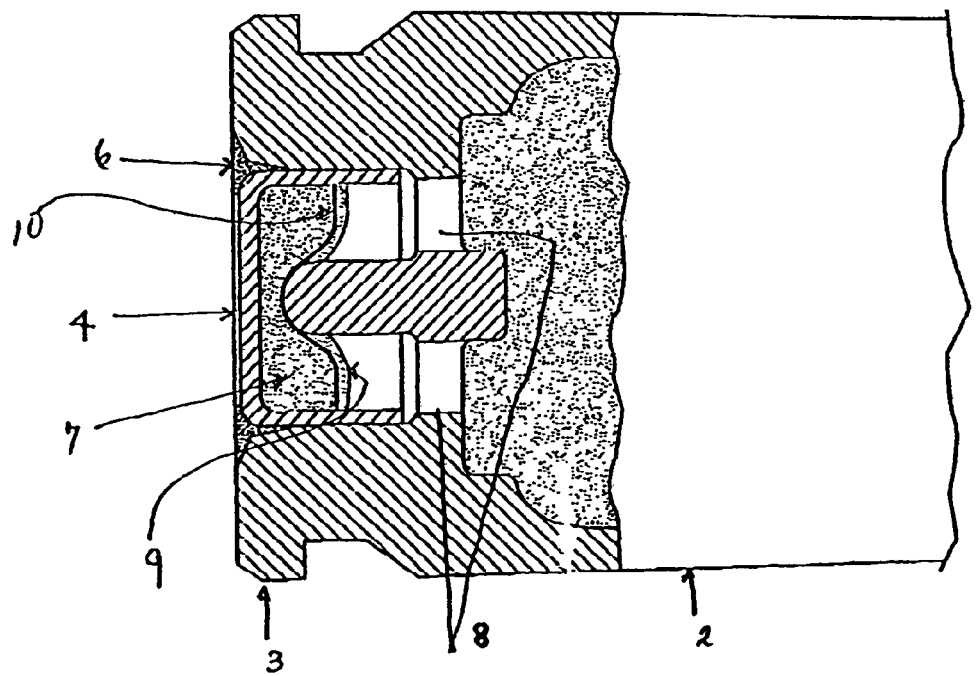
FIG. 2 depicts a partial cross sectional view of FIG. 1.

Reference to FIG. 1 shows the components of a single ammunition. The bullet 1 forms the front end of the ammunition, being attached to the cartridge case 2. The cartridge case rim 3 forms the back end of the ammunition, which is a primer pocket 5 dimensioned and disposed to receive a primer cup 4. Within the primer cup 4 is disposed primer mix, shown as 7 in FIG. 2. Reference again to FIG. 2 shows primer vent holes 8. Shown as 9 is the composition of the present invention; shown as 6 is an annulus ring seal. Anvil 10 is disposed over the primer mix 7, over which the inventive composition 9 is dispensed and cured.

The invention further includes a process for encapsulating the primer mix, the steps of which include providing a primer cup, dispensing into the primer cup a primer mix, optionally, providing onto the primer mix an anvil, dispensing onto and about either the anvil or directly onto the primer mix the inventive composition, and curing the inventive composition by exposure to visible light and/or UV/visible light and subsequently exposure to anaerobic conditions.

The invention further includes a process for assembling ammunition, the steps of which include providing at least a partially assembled cartridge, one end of which having a pocket dimensioned and disposed to receive a primer cup; providing a primer cup dimensioned and disposed to be received by the pocket of the partially assembled cartridge, in the primer cup is disposed a primer mix; applying the inventive composition over the primer mix disposed in the primer cup; exposing the composition to visible radiation, and optionally UV/visible radiation, sufficient to initiate cure; permitting the composition to cure under anaerobic conditions; and inserting the primer cup into the pocket.

The invention also provides ammunition, which includes a bullet forming the front end of the ammunition, to which the bullet is attached to a cartridge casing; a cartridge case forming the back end of the ammunition, in which is a primer pocket dimensioned and disposed to receive a primer cup; a primer cup dimensioned and disposed to be received by the primer pocket, in the primer cup is disposed a primer mix and an anvil; and the inventive composition dispensed over the primer mix and the anvil in the primer cup, after having been exposed to radiation in the visible range of the electromagnetic spectrum, optionally radiation in the UV/visible range of the electromagnetic spectrum, and anaerobic conditions.

EXAMPLES

Example 1

The following sample was prepared with the noted components in the amounts recited.

| Sample No. | Component | Amount Wt. % |
| --- | --- | --- |
| 1 | Polyethylene glycol dimethacrylate | 79.7 |
| | Trimethylolpropane Trimethacrylate | 14.0 |
| | Anaerobic cure-inducing composition | 4.8 |
| | "IRGACURE" 819 | 1 |
| | Dye | 5 |

Sample No. 1 was dispensed onto the anvil and wicked onto the primer mix in the primer cup. After dispensing, Sample No. 1 was exposed to visible light generated from a shielded metal halide lamp (MH-1500) for ten seconds with 0.107 and 0.205 J/sec A and V band exposure. After exposure, a film formed on the surface of Sample No. 1, and the metal anvil, in this case, brass, assisted in the anaerobic cure. Twenty replicates were prepared in this manner.

After cure, a portion of the replicates were hammered for detonation. All of the hammered replicates detonated. The remaining portion of replicates were placed in a 100% relative humidity chamber at 70° F. for 3 days. These replicates were also hammered for detonation. All of the hammered replicates also detonated.

Example 2

The following sample was prepared with the noted components in the amounts recited.

| Sample No. | Component | Amount Wt. % |
| --- | --- | --- |
| 2 | Polyethylene glycol dimethacrylate | 84 |
| | Tetraethylene glycol di(2-ethyl hexoate) | 10 |
| | Anaerobic cure-inducing composition | 2 |
| | "IRGACURE" 819 | 0.4 |
| | "IRGACURE" 184 | 3.5 |
| | Dye | 0.07 |

Sample No. 2 was dispensed onto the anvil and wicked onto the primer mix in the primer cup. After dispensing, Sample No. 2 was exposed to light generated from a shielded metal halide lamp (MH-1500) for ten seconds with 0.107 and 0.205 J/sec A and V band exposure. After exposure, a film formed on the surface of Sample No. 2, and the metal anvil, in this case also, brass, assisted in the anaerobic cure. Twenty replicates were prepared in this manner.

After cure, a portion of the replicates were hammered for detonation. All of the hammered replicates detonated. The remaining portion of replicates were placed in a 100% relative humidity chamber at 70° F. for 3 days. These replicates were also hammered for detonation. All of the hammered replicates also detonated.

The true scope of the invention is measured by the claims.

What is claimed is:

1. A process for assembling ammunition, the steps of which comprise:
   a. providing at least a partially assembled cartridge, one end of which having a pocket dimensioned and disposed to receive a primer cup;
   b. providing a primer cup dimensioned and disposed to be received by said pocket of said partially assembled cartridge, in said primer cup is disposed a primer mix;
   c. applying a composition over the primer mix disposed in the primer cup;
   d. exposing the composition to UV/visible radiation, sufficient to initiate cure;
   e. permitting the composition to cure under anaerobic conditions; and
   f. inserting said primer cup into said pocket, wherein said composition is a UV/visible radiation and anaerobically curable composition, comprising:
      a. (meth)acrylate component;
      b. an anaerobic cure-inducing component; and
      c. a photoinitiator component comprising a UV/visible light cure photoinitiator.

2. Ammunition comprising:
   a bullet forming the front end of the ammunition, to which the bullet is attached to a cartridge casing;

a cartridge case forming the back end of the ammunition, in which is a primer pocket dimensioned and disposed to receive a primer cup;

a primer cup dimensioned and disposed to be received by the primer pocket, in said primer cup is disposed a primer mix and an anvil; and a UV/visible radiation and anaerobically curable composition, comprising:

a. (meth)acrylate component;

b. an anaerobic cure-inducing component; and c. a photoinitiator component comprising a UV/visible light cure photoinitiator dispensed over the primer mix and anvil in the primer cup, after having been exposed to radiation in the UV/visible range of the electromagnetic spectrum, and anaerobic conditions.

* * * * *